Aug. 17, 1954 D. H. DASHIELL ET AL 2,686,637

DRIVE AND CONTROL MECHANISM FOR MAGNETIC RECORDING EQUIPMENT

Filed Feb. 28, 1948 4 Sheets-Sheet 1

INVENTORS
Daniel H. Dashiell
Lloyd J. Bobb

BY

Symmestvedt & Lechner
ATTORNEYS.

Aug. 17, 1954

D. H. DASHIELL ET AL
DRIVE AND CONTROL MECHANISM FOR
MAGNETIC RECORDING EQUIPMENT 2,686,637

Filed Feb. 28, 1948

4 Sheets-Sheet 2

INVENTORS
Daniel H. Dashiell
Lloyd J. Bobb
BY
Symmes & Lechner
ATTORNEYS

Aug. 17, 1954 D. H. DASHIELL ET AL 2,686,637

DRIVE AND CONTROL MECHANISM FOR MAGNETIC RECORDING EQUIPMENT

Filed Feb. 28, 1948 4 Sheets-Sheet 3

INVENTORS
Daniel H. Dashiell
Lloyd J. Bobb
BY
Synnestvedt & Lechner
ATTORNEYS

Aug. 17, 1954 D. H. DASHIELL ET AL 2,686,637

DRIVE AND CONTROL MECHANISM FOR MAGNETIC RECORDING EQUIPMENT

Filed Feb. 28, 1948 4 Sheets-Sheet 4

INVENTORS
Daniel H. Dashiell
Lloyd J. Bobb

BY Synnestvedt & Lechner
ATTORNEYS.

Patented Aug. 17, 1954

2,686,637

UNITED STATES PATENT OFFICE 2,686,637

DRIVE AND CONTROL MECHANISM FOR MAGNETIC RECORDING EQUIPMENT

Daniel H. Dashiell, Philadelphia, and Lloyd J. Bobb, Glenside, Pa., assignors to The International Electronics Company, Philadelphia, Pa., a corporation of Pennsylvania Application February 28, 1948, Serial No. 11,995

20 Claims. (Cl. 242—55)

This invention relates to equipment of the type adapted for recording on and reproducing from elongated magnetic records, especially tape records, for instance a paper tape carrying a coating in which magnetizable particles are dispersed.

A machine of the general type to which this invention relates comprises a pair of reels between which the tape record is adapted to be fed, and further comprising a tape driving capstan adapted to engage the tape in its path of travel between the reels and to determine the speed of translation of the tape. In a machine of this type a magnetic recording-reproducing head is customarily positioned adjacent the path of the tape between the reels for purposes of effecting magnetic recording or reproduction. Still more specifically, the type of machine with which the invention is particularly concerned is one in which provision is made for recording or reproducing two side-by-side tracks on a tape record, one of such tracks being recorded or reproduced in one direction and the other in the opposite direction.

The present invention is especially concerned with the drive and drive control mechanism of a machine of the general type referred to above, and in this connection it is mentioned that it has been difficult hereofore to provide a drive having a high degree of driving stability, such stability being exceedingly important particularly in the recording and reproduction of music, in order to avoid "wow." It is an object of the present invention to provide a highly stable drive which is exceedingly simple and inexpensive from the standpoint of structure and manufacture.

Other features of the invention include improvements in controls and control interlocks, as will further appear as this description proceeds.

How the foregoing and other objects and advantages are attained will appear more fully from the following description of the accompanying drawings, in which—

Figure 1:
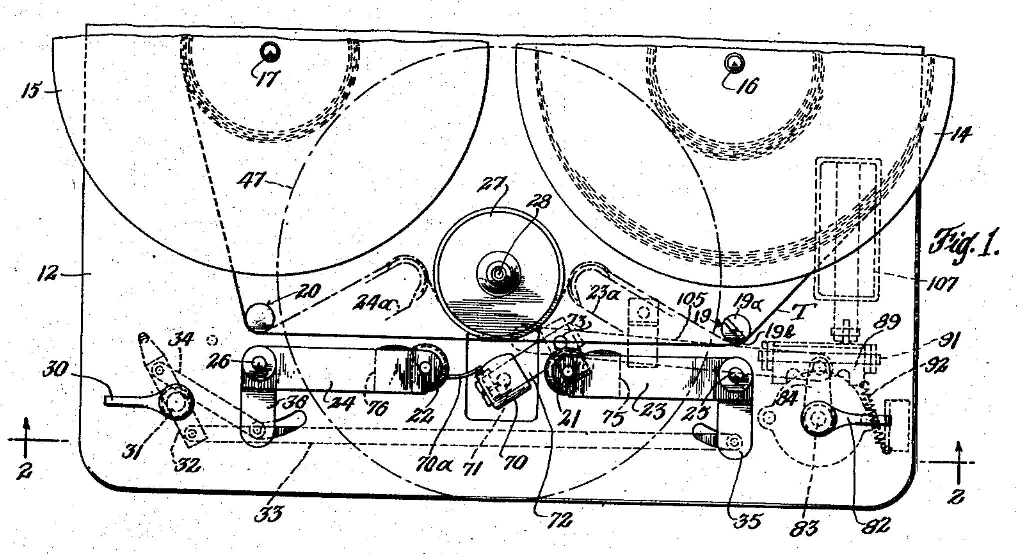
Figure 1 is a partial plan view of a machine constructed according to the present invention.

Th frame of the machine comprises a top deck 12 and a bottom plate 13. A pair of tape reels 14 and 15 are mounted on reel shafts 16 and 17, these shafts being journaled in supporting sleeve such as indicated at 18.

A tape record is indicated at T and the path of the tape between the reels is defined by various guide elements including guide posts 19 and 20 and the members 21 and 22. The latter members are mounted on levers 23 and 24 which are pivoted respectively at 25 and 26 so as to provide movement of the levers and members 21 and 22 between the full line position shown in Figure 1 and the dot-and-dash line position shown in this same figure at 23*a* and 24*a*. The dotted line position is the operating position for these parts, the full line position being employed when a tape is being threaded in the machine. Thus, for purposes of threading, all that is needed is that the end of the tape, for instance the free end taken from a full reel 14 is led past guide post 19 and across the machine to pass around guide post 20, after which the end of the tape is fastened to the reel 15. Upon pivotal movement of levers 23 and 24 to the dot-and-dash positions 23*a* and 24*a*, the guide members 21 and 22 come into operation and serve to engage the tape with the tape driving capstan 27 which is mounted on a shaft 28 within a supporting sleeve 29 (see particularly Fig. 4). The capstan 27 constitutes the drive element which determines the speed of translation of the tape between the reels.

Arms 23 and 24 are adapted to be moved by a control comprising an operating handle 30 mounted on a shaft 31, this shaft carrying a double-ended lever 32 to which two links 33 and 34 are pivoted. Link 33 is also pivoted to arm 35 of lever 23 and link 34 is pivoted to arm 36 of lever 24. Adjustment of the operating handle 30 thus regulates the pivotal position of levers 23 and 24.

Figure 6:
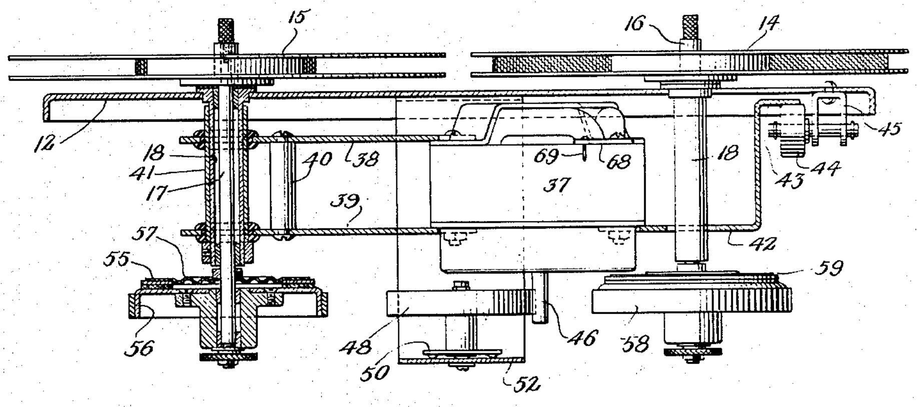
Figure 6 is a vertical sectional view taken generally as indicated by line 6—6 on Figure 3.
Figure 7:
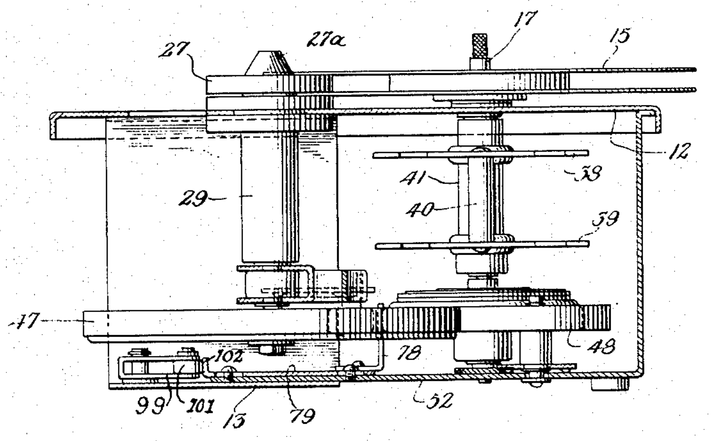
Figure 7 is a vertical sectional view taken as indicated by line 7—7 on Figure 3.

The drive system comprises a motor 37 which is mounted by means of a frame or support comprising a pair of vertically spaced plates 38 and 39 which are secured to each other by means of post 40 and which are apertured to provide a pivot bearing for the motor support on a strengthening sleeve 41 which surrounds the reel shaft mounting sleeve 18 for reel 15 (see Figure 6). An additional plate member 42 is secured to the motor and has an upturned portion provided with a flange 43 serving as a track adapted to ride upon the roller 44 during pivotal movement of the motor support. Roller 44 may be slung beneath the top deck 12 by means of a yoke 45.

From Figure 6 it will be seen that the motor is supported in position with its shaft 46 projecting downwardly, so that upon pivotal movement of the motor support the shaft 46 may be brought into engagement with the periphery of the driving disc 47 (see Fig. 3) which is secured to the capstan shaft 28. It is here mentioned that except for the showing of Figure 10, all of the figures illustrate the operating parts of the machine in "Neutral" position of adjustment. In this position the motor shaft 46 is disengaged from the capstan driving disc 47.

The capstan driving disc is preferably provided with resilient friction material around the periphery thereof so as to provide effective driving interengagement between the disc and the motor shaft.

Figures 3, 5:
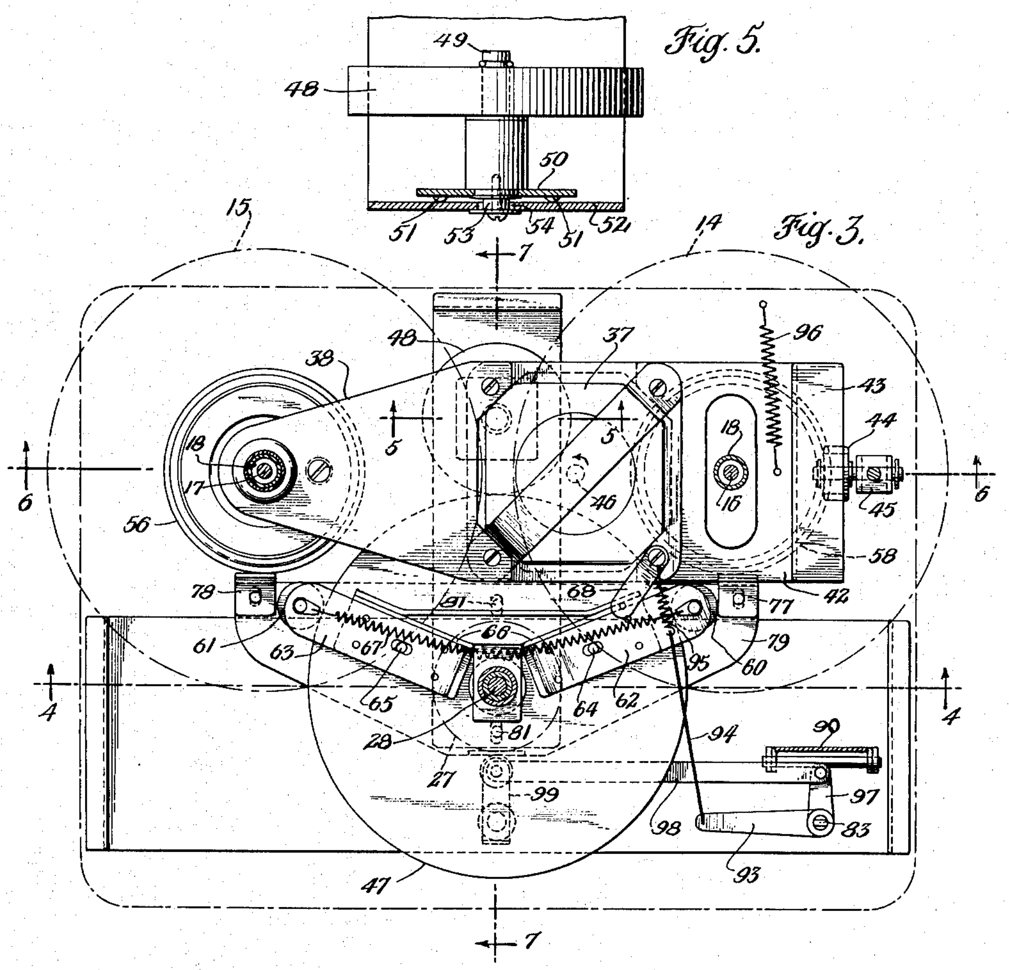
Figure 3 is a plan view of various of the drive and operating parts, this view being taken as indicated by the section line 3—3 on Figure 4.
Figure 5 is an enlarged view of a detail taken as indicated by line 5—5 on Figure 3.

It is contemplated according to the present invention that a simple and inexpensive unidirectional motor be employed for the source of power. However, it is contemplated that drive of the capstan may be effected in either direction, and this is accomplished according to the present invention in an exceedingly simple manner, i. e., by the provision of an idler 48. As shown in Figure 5 this idler is journaled on a supporting shaft 49 which is carried by a small plate 50 having rounded feet 51 resting on a supporting strip 52. A member 53 secured to the idler shaft projects downwardly through an oversized aperture 54 in the supporting strip 52, this arrangement providing freedom for limited shifting movement of the idler in horizontal direction. As seen in Figure 3 the idler is mounted with its periphery adjacent to the periphery of the capstan driving disc 47 and from this same figure it will also be observed that the motor mount is so arranged that upon pivotal movement of the motor mount in one direction the motor shaft 46 engages the disc 47, and upon pivotal movement of the motor in the opposite direction the shaft 46 engages the periphery of the idler 48. Thus, pivotal movement of the motor shaft serves to reverse the direction of drive. The normal direction of rotation of the motor shaft is indicated by the arrow in Figure 3, and with this direction of rotation the drive train through the idler 48 is "self-energized," i. e., the action of the drive tends to draw the idler into tight frictional engagement with the motor shaft and with the capstan driving disc 47. The lost motion mounting for the idler at 53—54 permits the required freedom of motion to ensure effective self-energizing operation.

Turning now to the drive for the tape reels, particular reference is now made to Figure 6. As shown at the left of Figure 6, the reel mounting shaft 17 has an annular friction clutch member 55 secured thereto and adapted to frictionally engage the top surface of a driving drum 56, the clutch member 55 being urged toward the drum by means of the circular annularly corrugated mounting spring 57. Driving drum 56 is rotatively mounted on the shaft 17. Similarly, reel shaft 16 is provided with a driving drum 58 which is rotatively mounted on the reel shaft but connected therewith through the clutch device 59. Each of drums 56 and 58 is provided with a peripheral strip of resilient friction material.

Figure 4:
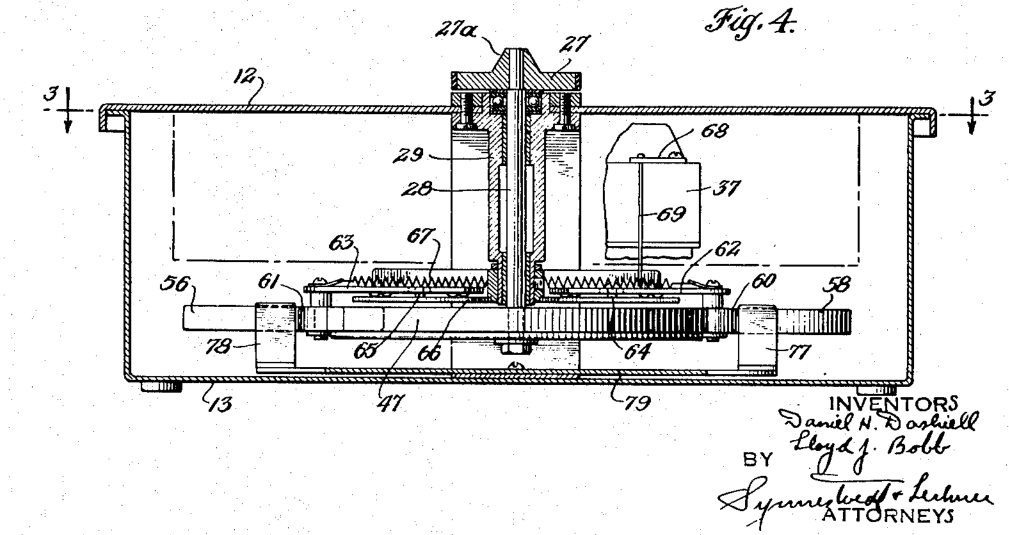
Figure 4 is a vertical sectional view taken as indicated by the line 4—4 on Figure 3, certain parts being omitted for the sake of clarity of description.

Drive of one or the other of the members 56 and 58 is effected by means of idler rollers 60 and 61 which are mounted on plates 62 and 63 having pin and slot connections 64 and 65 with opposite arms of a support or walking beam 66, which latter is pivoted coaxially of the capstan shaft 28. As seen in Figure 4 the idler support 66 is journaled on a reduced portion of sleeve 29 provided at the lower end thereof. A spring 67 serves to yieldingly urge the idlers against the periphery of the capstan driving disc 47.

The pivotal movement of the support 66 provides for alternative engagement of idler 60 with reel drive member 58 or of idler 61 with reel drive member 56. Shifting of the idler support is effected in coordination with the shifting of the motor support to reverse the operation of the machine, and for this purpose a tab 68 is carried by the motor to provide a support for a spring shifter element 69 (see Figures 3, 4 and 6). The lower end of this spring is connected with the idler support 66. In this way, when the motor support is shifted in the direction to bring the motor shaft into engagement with the capstan driving disc 47, idler 61 is brought into engagement with the reel drive member 56, and this results in drive of reel 15 so as to take up the tape being fed thereto from reel 14. On the other hand, when the motor support is shifted in the opposite direction to bring the motor shaft into engagement with idler 48 the capstan drive is reversed and concurrently the idler support is shifted to bring idler 60 into engagement with the drive member 58 for the reel 14. It may here be pointed out that the slip clutches 55 and 59 between the reel drive members 56 and 58 and the reels themselves function to provide a limited tension in the tape without, however, disturbing the speed of translation of the tape as determined by the capstan 27.

Figure 9:
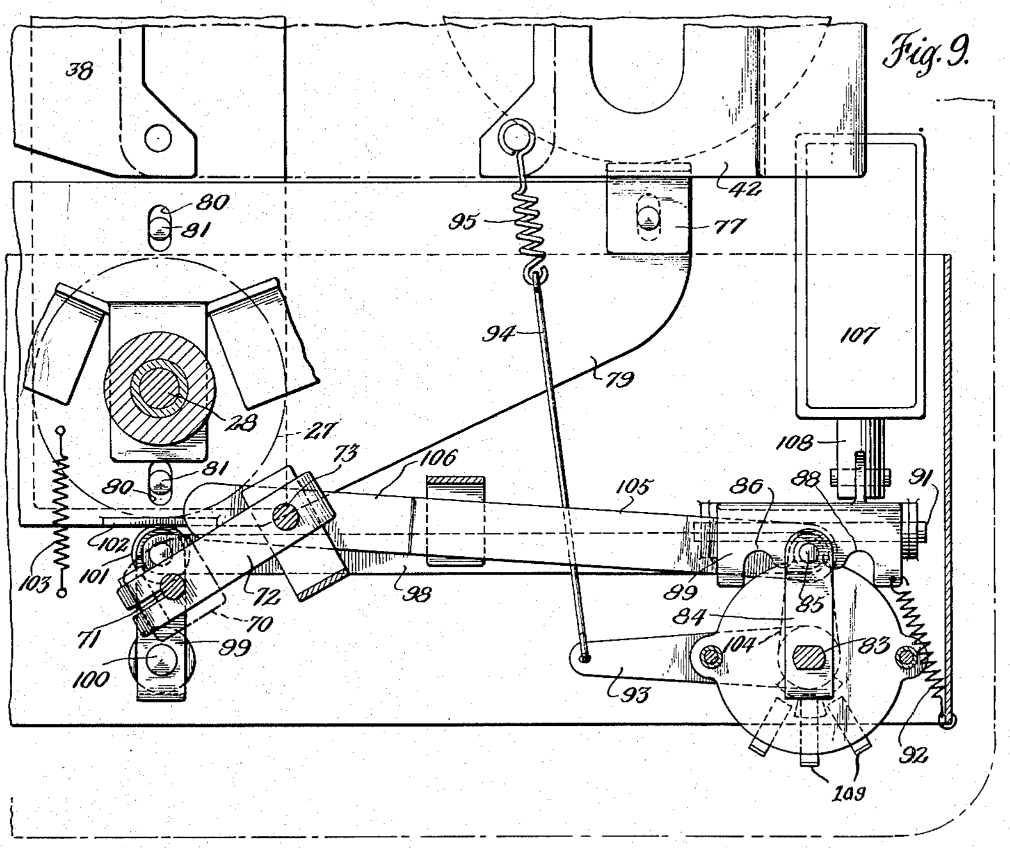
Figure 9 is a view of certain parts taken substantially as indicated by line 9—9 on Figure 2, but to an enlarged scale.

Turning again to Figures 1 and 2, and also referring to Figure 9, a magnetic recording-reproducing head 70 is mounted on a pin 71 which is carried by an arm 72 provided with a pivot 73. The head is thus mounted for pivotal movement toward and away from the tape on the capstan 27 and it is normally urged against the capstan by a torsion spring 74. The pivot 73 further provides freedom for vertical movement of the head 70, so as to shift the head from one track to another on the tape.

The head 70 is displaced away from the capstan by means of an abutment member 70*a* carried by arm 24. Thus, the head is moved away from the capstan whenever the operating lever 30 is actuated to move the arms 23 and 24 to the full line position of Figure 1, i. e., the position provided for convenient threading of a tape in the machine, as is fully described in copending application of Frank J. Reed, Serial No. 742,776, filed April 21, 1947.

Attention is also directed to the fact that arm 23 carries an erasing head 75 and arm 24 carries an erasing head 76. These erasing heads have their pole pieces staggered transversely of the tape and are effective, during recording, to erase any previously recorded material in the particular track being freshly recorded.

Still another feature of the invention is the provision of braking means for arresting rotation of the tape reels. Brake shoes 77 and 78 are adapted to cooperate respectively with drive members 58 and 56 for the two tape reels. The brake shoes are adjustably mounted on a brake operating plate 79 which has a pair of elongated apertures 80—80 with which pins 81—81 cooperate so as to provide for guided movement of the plate 79.

Various of the drive, brake and other parts are controlled by the control mechanism described just below.

Figure 2:
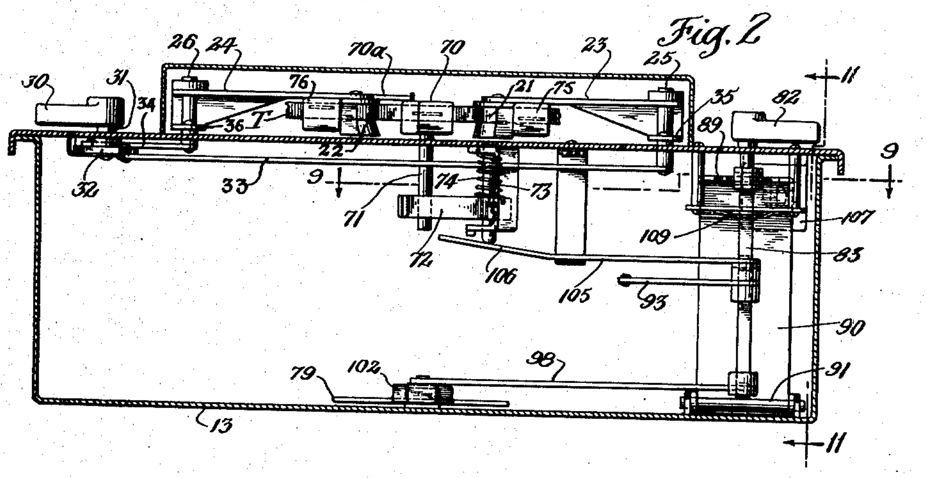
Figure 2 is a vertical sectional view taken as indicated by the section line 2—2 on Figure 1.

Toward the right hand side of the machine when viewed as in Figure 1 a control handle 82 is provided, this handle being mounted on a control shaft 83. Shaft 83 carries an arm 84 in turn carrying a pin 85 adapted to engage in one or another of the notches 86, 87 and 88 (see particularly Figures 9, 10 and 11), which notches correspond respectively to three positions of adjustment, i. e., "Forward" position, "Neutral" position and "Reverse" position. The notches 86, 87 and 88 are formed in the edge of an angled part 89 of the vertical strip 90 which is pivoted to the base plate 13 of the machine as at 91. The notched plate device is urged toward the control shaft by means of a spring 92, although the operating parts just described are such that manual movement of the control lever 82 will displace the notched plate against the action of spring 92 and thus permit manual adjustment.

Control shaft 83 further carries an arm 93 which is linked to the motor through a link 94 and spring 95. Movement of the control handle and shaft in a counterclockwise direction when viewed as in Figures 1, 9 and 10 thus causes the motor to swing in a direction to bring the motor shaft 46 into engagement with the capstan driving disc 47. A return spring is associated with the motor mount, i. e., spring 96 as shown in Figure 3. When the control lever 82 is moved in a clockwise direction, spring 96 functions to move the motor mount so as to bring motor shaft 46 into engagement with the reversing idler 48. In addition spring 96 serves another function, i. e., it will automatically shift the control shaft and lever in the clockwise direction upon release of the notched plate, such release being effected by means referred to hereinafter. In Neutral position the motor shaft 46 is disengaged from both the disc 47 and the idler 48. This is of importance since if the machine is allowed to stand idle with the motor shaft in engagement with the friction surfacing material of the disc 47, an indentation will be produced, which would adversely influence the uniformity of capstan drive when the machine is again operated.

Control shaft 83 still further carries an arm 97 (see Figures 3, 9 and 11) to which link 98 is pivoted, the other end of link 98 being pivoted to an arm 99 which is pivotally supported at 100 and carries a roller 101 adapted to bear against an upturned lip 102 formed on the brake operating plate 79. Arm 99 and roller 101 act in the manner of a toggle, the parts being arranged so that when the control lever 82 is adjusted to the Neutral position (corresponding to notch 87) the brakes are applied, but the brake pressure is relieved upon adjustment of the control lever to either of the operating positions. A return spring 103 serves to disengage the brakes when the control handle 82 is positioned in either the Forward or Reverse positions.

Still another function performed by the control shaft 83 is to shift magnetic head 70 in a vertical direction from one track to the other on the tape being recorded or reproduced. For this purpose shaft 83 carries an arm 104 to which the strip 105 is pivoted, this strip having an inclined or camming portion 106 (see Figure 2) arranged to contact the lower end of pivot 73 for the head 70. Thus the head is also shifted by the control shaft when the direction of operation is reversed.

Figure 11:
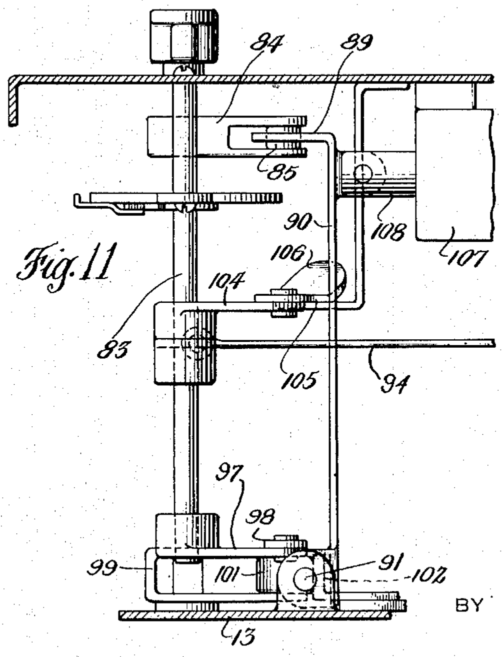
Figure 11 is a view on the same scale as Figure 9 but taken as indicated by the line 11—11 on Figure 2.
Figure 10:
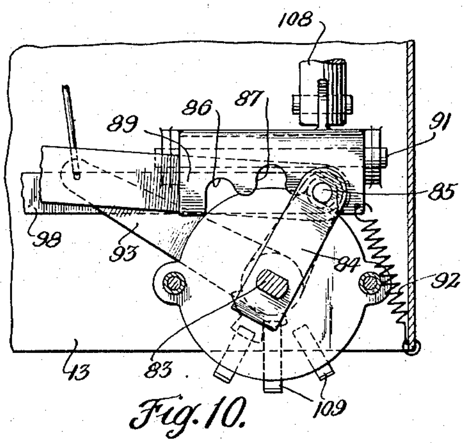
Figure 10 is a view of certain parts shown in Figure 9 but in a different position of adjustment.

For the purpose of automatically tripping the control at the end of a tape run, a solenoid 107 is provided, the armature 108 of this solenoid being pivotally connected with the vertical strip 90 (see Figures 9, 10 and 11). Energization of the solenoid displaces the notched plate against the action of spring 92. Solenoid 107 is adapted to be controlled by a metal contact element applied to and carried by a tape adjacent an end of a record thereon. This metal contact element is adapted to bridge and interconnect the two parts 19*a* and 19*b* of the guide post 19. These two parts are insulated from each other and in effect constitute switch contacts which are in the circuit of the solenoid 107.

With the arrangement as described, in a typical operation, for example the purpose of recording a tape, a fresh reel is placed in the position of reel 14 and the free end of the tape is led therefrom and threaded through the machine and started upon a reel in the position of reel 15. The control lever 30 is operated to advance the arms 23 and 24 so as to bring the tape into engagement with the capstan 27 and further to permit the head 70 to engage the tape on the capstan. Control 82 is then moved to the Forward position (corresponding to notch 86) and recording may commence. At this time erasing head 75 is desirably energized so as to erase any previously recorded material on the tape. The recording continues until the contact element on the tape toward the end thereof near the center or core of reel 14 engages the contacts of the guide post 19, whereupon the solenoid 107 is energized to displace the notched plate, and this permits the return spring 96 to move the control shaft 83 to the reverse position, whereupon recording may continue in the opposite direction. At this time erase head 76 may be energized so as to ensure erasure of any previously recorded material on the other track of the tape record. Selective energization of the erase heads is desirably accomplished by switch means associated with the control shaft 83, for example in the manner described in application of Frank J. Reed and Lloyd J. Bobb, Serial No. 11,994, filed concurrently herewith.

Still another feature of importance to be noted is that the control shaft 83 operates a switch 109 which shuts off the supply of current to the motor when the machine is adjusted to the Neutral position. During reversal, however, since a unidirectional motor is utilized, the Neutral position is quite quickly past before the motor has an opportunity to decelerate to any appreciable extent, and in consequence very rapid reversal of the direction of translation of the tape is provided.

Figure 8:
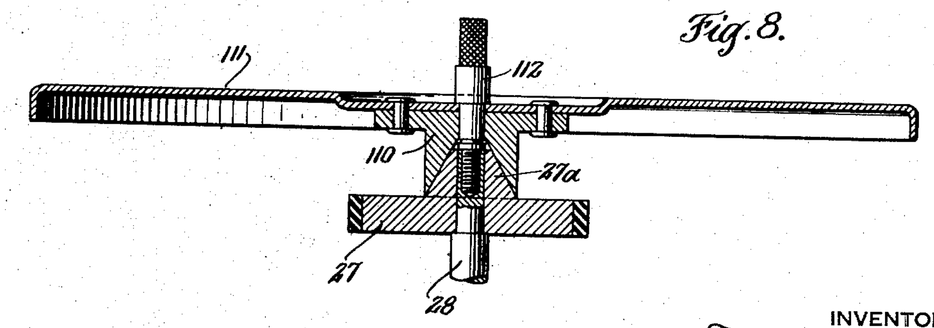
Figure 8 is a vertical sectional view through the tape driving capstan, with a disc record turntable mounted thereon.

It is contemplated according to the invention that the capstan drive shall be so arranged as to provide for rotation thereof at 78 R. P. M., which is the standard phonograph disc recording speed. The invention contemplates that tape recordings may be made from such disc recordings merely by mounting a turntable on the capstan, as is shown in Figure 8. Here it will be seen that the capstan has an upwardly projecting tapered part 27a adapted to engage in a corresponding recess formed in a hub 110 of a turntable 111. The turntable is removably secured to the capstan by a screw 112 which serves also as a spindle for centering a disc record on the turntable.

In considering the advantages of the arrangement described it is first noted that the operating parts are exceedingly simple. They are, moreover, exceptionally stable in drive, especially with reference to capstan drive. In this connection it is of considerable importance to provide an idler support (66) of relatively small mass. Preferably this support is made of aluminum or some other very light metal or alloy, since in this way the mass of the support is kept at a minimum. It has been found that with an idler support of relatively large mass, the idlers sometimes tend to chatter against the capstan driving disc, and thereby disturb the uniformity of capstan drive.

We claim:

1. Equipment for use with elongated magnetic records, comprising in combination with a pair of reels between which a record is adapted to be fed in either direction, a rotative record driving capstan engageable with a record in its path of feed between the reels, a capstan driving disc rotative with the capstan, a motor having a driving shaft, a motor support providing for movement of the motor to bring its shaft into and out of engagement with said disc, and an idler disc operatively interposed between the capstan driving disc and the motor shaft in one position of adjustment of the motor shaft, whereby to provide for alternative drive of the capstan in either direction.

2. A construction according to claim 1 and further comprising mechanism for alternatively driving one or the other of the record reels including reel driving members engageable with the capstan driving disc.

3. A construction according to claim 1 and further comprising mechanism for alternatively driving one or the other of the record reels including for each reel a disconnectible drive train engageable with the capstan driving disc to receive power therefrom.

4. A construction according to claim 1 and further comprising mechanism for alternatively driving one or the other of the record reels including for each reel a disconnectible drive train engageable with the capstan driving disc to receive power therefrom, and a control interlock between the movable motor support and the disconnectible drive trains for the record reels providing for disconnection of one drive train and connection of the other when the capstan is being driven in one direction and for connection of the first drive train and disconnection of the second when the capstan is being driven in the opposite direction.

5. Equipment for use with elongated magnetic records, comprising a pair of record reels between which a record is adapted to be fed, a record driving capstan engageable with a record in the path of feed thereof between the reels, a capstan driving disc rotative with the capstan, a driving motor having a driving shaft, and a motor support pivoted coaxially with a reel axis and pivotally movable to bring the motor driving shaft into and out of engagement with the capstan driving disc.

6. Equipment for use with an elongated magnetic record adapted to be fed from one reel to another, comprising in combination with a pair of reel supporting spindles arranged on parallel spaced axes, a record driving capstan having its axis parallel to the axes of the reel spindles and offset from the plane containing the axes of the reel spindles, a motor arranged with the axis of its driving shaft parallel to the other axes mentioned in a plane intermediate the reel spindles, drive mechanism adapted to interconnect the motor shaft and the capstan including a rotative drive element, a reversing wheel adapted to engage said drive element, and a support for the motor providing for movement thereof between positions in which the motor shaft alternatively engages said reversing wheel and said drive element.

7. Equipment for use with an elongated magnetic record adapted to be fed from one reel to another, comprising in combination with a pair of reel supporting spindles, a record driving capstan adapted to engage a record in its path of feed between the reels, a motor having a driving shaft, the axes of said spindles, capstan and motor shaft all being substantially parallel, drive mechanism for interconnecting the capstan and the motor shaft including a drive element rotative with the capstan, a reversing wheel adapted to engage said element, and a support for the motor providing for movement of the motor between positions in which said motor shaft alternatively engages said reversing wheel and said element.

8. A construction according to claim 7 in which the motor support is pivoted coaxially with a reel spindle.

9. A construction according to claim 7 and further including disconnectible drive trains for driving the reels each receiving power from said capstan driving element.

10. A construction according to claim 9 and further including a control for shifting the motor support and concurrently and alternatively activating the reel drive trains.

11. Equipment for use with an elongated magnetic record adapted to be fed from one reel to another, comprising in combination with a pair of reel supporting spindles, a record driving capstan adapted to engage a record in its path of feed between the reels, a motor having a driving shaft, the axes of said spindles, capstan and motor shaft all being substantially parallel, drive mechanism for interconnecting the capstan and the motor shaft including a drive element rotative with the capstan, a reversing wheel adapted to engage said element, a support for the motor providing for movement of the motor to a position in which the motor shaft engages the reversing wheel, a position in which the motor shaft engages the drive element and a neutral position in which the motor shaft is disconnected from both the reversing wheel and said element, and a control for shifting the motor support between said positions and providing for shut-off of the motor when in the neutral position and for energizing of the motor in both of the other positions.

12. A construction according to claim 11 and further including disconnectible reel drive trains alternatively connectible with said capstan drive element.

13. In a magnetic recording and/or reproducing instrument that comprises mechanism for driving an elongate flexible record body including a rotatable element and an electric motor having an output spindle, said mechanism being convertible between record body-driving and idle conditions, a wheel that is rotatable to drive said rotatable element and having a peripheral frictional driving surface, means mounting said motor with its output spindle parallel to the axis of rotation of said wheel and for swinging about a pivot axis disposed parallel to and spaced from the axes of rotation of said wheel and spindle for movement of the latter toward and away from said peripheral driving surface, and spring means biasing the motor about said pivot axis in a direction to urge said spindle into pressure-exerting contact with said peripheral surface; a shaft manually rotatable between two preselected positions, means actuable by said shaft for converting said mechanism between its record body-driving and idle conditions by rotation of said shaft between its two said positions, and means coupled eccentrically with said shaft and actuable by its rotation to said positions respectively to swing said motor to a position wherein its spindle is spaced from said peripheral surface when said shaft is moved to its position to convert said mechanism to its idle condition and to release said motor for urging of its spindle against the peripheral surface by said biasing spring means when said shaft is rotated to its other said position.

14. In a magnetic recording and/or reproducing instrument that comprises a rotatable element for driving an elongate flexible record body, an electric motor for rotating said element and having an output spindle, and a switch controlling operation of said motor and having an operator movable between predetermined positions respectively effective to maintain said motor stopped and in operation; a wheel that is rotatable to drive said rotatable element and having a peripheral friction driving surface, means mounting said motor with its output spindle parallel to the axis of rotation of said wheel and for swinging about a pivot axis spaced from and parallel to the axes of rotation of said spindle and wheel for movement of the former toward and away from said peripheral driving surface, spring means biasing the motor about said pivot axis in a direction to urge said spindle into pressure-exerting contact with said peripheral surface, and means operatively connected with said switch operator and actuable by movement of the latter to its motor-stopped position to swing the motor about said pivot axis to a position wherein said spindle is spaced from said peripheral surface, and by movement of said operator to its motor-operation position to release said motor for swinging by said spring bias means to urge said spindle into pressure-exerting contact with said peripheral surface.

15. In a magnetic recording and/or reproducing instrument that comprises mechanism for driving an elongate flexible record body including a rotatable element and an electric motor having an output spindle, said mechanism being convertible between record body-driving and idle conditions, a wheel that is rotatable to drive said rotatable element and having a peripheral frictional driving surface, means mounting said motor with its output spindle parallel to the axis of rotation of said wheel and for swinging about a pivot axis disposed parallel to and spaced from the axes of rotation of said wheel and spindle for movement of the latter toward and away from said peripheral driving surface, a shaft manually rotatable between two preselected positions, a motor switch actuable by rotation of said shaft to start the motor in the first of said preselected positions and to stop the motor in the second of said preselected positions, and mechanism operated by rotation of said shaft between said two preselected positions for moving the output spindle of the motor into and out of engagement with said peripheral frictional driving surface including means acting to disengage the output spindle from the peripheral frictional driving surface when the shaft is rotated to said second preselected position and further including a spring acting to establish yielding engagement of the output spindle with the peripheral frictional driving surface when the shaft is rotated to said first preselected position.

16. Equipment for use with elongated magnetic records adapted to be fed in either direction between a pair of reels, comprising in combination with a pair of reel supporting spindles, a drive motor having a driving element, reel drive mechanism including a driven element engageable with the driving element of the motor to drive one reel spindle and another driven element engageable with the driving element of the motor to drive the other reel spindle, all three of said elements being rotatable on spaced substantially parallel axes and the motor with its driving element being mounted for pivotal movement to provide for shifting movements of the driving element of the motor between three positions in the first of which the driving element engages one of said driven elements, in the second of which the driving element engages the other driven element and in the third of which the driving element is disengaged from both of the driven elements, said third position lying intermediate the first and second positions, said elements having peripheral friction driving surfaces, a device for starting and stopping the motor, and control mechanism including manually operable control means adjustable between three conditions corresponding to the three positions first mentioned, and connections between the control means and the motor and between the control means and said device providing for stopping of the motor when the control means is adjusted to the condition corresponding to said intermediate position of the motor in which the driving element is disengaged from both of the driven elements and providing for starting of the motor when the control means is adjusted to either of the other conditions in which the driving element of the motor is engaged with one or the other of the driven elements.

17. Equipment according to claim 16 and further including spring means acting on the motor in the first and second positions thereof to yieldingly maintain the driving element of the motor in frictional engagement with the first and second driven elements.

18. Equipment for use with elongated magnetic records adapted to be fed between a pair of reels, comprising in combination with a spindle for supporting a supply reel and a spindle for supporting a take-up reel, a record driving capstan arranged to engage a record in the path of feed between the reels and to establish constant speed record feed from the supply reel to the take-up reel, a drive motor having a driving element, a driven element connected with the capstan for engagement with the driving element of the motor, disengageable drive mechanism for the take-up reel, said driving and driven elements being rotatable on spaced parallel axes and the motor with its driving element being mounted for pivotal movement about an axis parallel to the axes of rotation of said elements and spaced therefrom to provide for shifting movements of the driving element of the motor between two positions in the first of which the driving element engages said driven element and in the second of which the driving element is disengaged from the driven element, said elements having peripheral friction driving surfaces, a device for starting and stopping the motor, and control mechanism including a manually operable control member movable between two positions corresponding to the two positions first mentioned, and connections between the control member and the motor, between the control member and said device, and between the control member and said disengageable reel drive mechanism providing in said first position for engagement of the driving element of the motor with the driven element for the capstan, for actuation of said device to start the motor, and for engagement of said disengageable reel drive mechanism, and in said second position for disengagement of the driving element of the motor from the driven element for the capstan, for actuation of said device to stop the motor, and for disengagement of said reel drive mechanism.

19. Equipment for use with elongated magnetic records adapted to be fed between a pair of reels, comprising in combination with a spindle for supporting a supply reel and a spindle for supporting a take-up reel, a record driving capstan arranged to engage a record in the path of feed between the reels and to establish constant speed record feed from the supply reel to the take-up reel, a drive motor having a driving element, a driven element connected with the capstan for engagement with the driving element of the motor, drive mechanism for the take-up reel connected with the capstan, said driving and driven elements being rotatable on spaced parallel axes and the motor with its driving element being mounted for pivotal movement about an axis parallel to the axes of rotation of said elements and spaced therefrom to provide for shifting movements of the driving element of the motor between two positions in the first of which the driving element engages said driven element and in the second of which the driving element is disengaged from the driven element, said elements having peripheral friction driving surfaces, a device for starting and stopping the motor, and control mechanism including a manually operable control member movable between two positions corresponding to the two positions first mentioned, and connections between the control member and the motor and between the control member and said device providing in said first position for engagement of the driving element of the motor with the driven element for the capstan and thus for rotation of both the capstan and the take-up reel and for actuation of said device to start the motor, and in said second position for disengagement of the driving element of the motor from the driven element for the capstan and for actuation of said device to stop the motor.

20. Equipment for use with elongated magnetic records adapted to be fed in either direction between a pair of reels, comprising in combination with a spindle for supporting a supply reel and a spindle for supporting a take-up reel, a record driving capstan arranged to engage a record in the path of feed between the reels to establish constant speed record feed from the supply reel to the take-up reel, a disengageable capstan drive, a drive motor having a driving element, reel drive mechanism including a driven element engageable with the driving element of the motor to drive one reel spindle and another driven element engageable with the driving element of the motor to drive the other reel spindle, all three of said elements being rotatable on spaced substantially parallel axes and the motor with its driving element being mounted for pivotal movement to provide for shifting movement of the driving element of the motor between three positions in the first of which the driving element engages one of said driven elements, in the second of which the driving element engages the other driven element and in the third of which the driving element is disengaged from both of the driven elements, said third position lying intermediate the first and second positions, said elements having peripheral friction driving surfaces, a brake for the supply reel, a brake for the take-up reel, and control mechanism including manually operable control means adjustable between three conditions corresponding to the three positions first mentioned, and connections between the control means and the disengageable capstan drive, between the control means and said motor, and between the control means and the brakes providing for disengagement of the capstan drive and for application of the brakes when the control means is adjusted to the condition corresponding to said intermediate position of the motor in which the driving element is disengaged from both of the driven elements, and providing for release of the brakes when the control means is adjusted to either of the other conditions in which the driving element of the motor is engaged with one or the other of the driven elements, and the control connections further providing for engagement of the disengageable capstan drive when the control means is adjusted to at least one of said other conditions.

References Cited in the file of this patent

UNITED STATES PATENTS

| Number | Name | Date |
|---|---|---|
| 771,861 | Curtis | Oct. 11, 1904 |
| 1,789,607 | Steurer | Jan. 20, 1931 |
| 1,845,462 | Wellman | Feb. 16, 1932 |
| 1,846,004 | Green | Feb. 16, 1932 |
| 1,904,490 | Mallina | Apr. 18, 1933 |
| 1,926,862 | Wellman | Sept. 12, 1933 |
| 1,979,350 | Schmittgen | Nov. 6, 1934 |
| 2,084,947 | Czeiza et al. | June 22, 1937 |
| 2,091,756 | Fodor | Aug. 31, 1937 |
| 2,096,805 | Hickman | Oct. 26, 1937 |
| 2,190,198 | Stechbart | Feb. 13, 1940 |
| 2,353,763 | Rodman | July 18, 1944 |
| 2,481,004 | Dale | Sept. 6, 1949 |

FOREIGN PATENTS

| Number | Country | Date |
|---|---|---|
| 327,104 | Germany | Oct. 7, 1920 |
| 506,232 | Germany | Sept. 1, 1930 |